US012689169B2

(12) United States Patent
Su et al.

(10) Patent No.: US 12,689,169 B2
(45) Date of Patent: Jul. 21, 2026

(54) ELECTRICAL CONNECTOR CONTACT MODULE HAVING A ROW OF CONTACTS WITH LOWER LEVEL SEGMENTS OFFSET FROM SOLDERING TAILS THEREOF

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Jie Su, Huaian (CN); Jun Zhao, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 312 days.

(21) Appl. No.: 18/214,773

(22) Filed: Jun. 27, 2023

(65) Prior Publication Data

US 2024/0006837 A1 Jan. 4, 2024

(30) Foreign Application Priority Data

Jun. 29, 2022 (CN) ......................... 202210756413.7

(51) Int. Cl.
*H01R 43/24* (2006.01)
*H01R 43/02* (2006.01)

(52) U.S. Cl.
CPC ............. *H01R 43/24* (2013.01); *H01R 43/02* (2013.01)

(58) Field of Classification Search
CPC ...... H01R 43/24; H01R 43/02; H01R 12/724; H01R 13/6585; H01R 13/405; H01R 24/60; H01R 13/02
See application file for complete search history.

(56) References Cited

U.S. PATENT DOCUMENTS

| | | | | |
|---|---|---|---|---|
| 6,193,552 B1 * | 2/2001 | Chiou | H01R 13/405 439/607.35 |
| 9,496,664 B2 * | 11/2016 | Little | H01R 24/60 |
| 2012/0231675 A1 * | 9/2012 | Zhang | H01R 12/724 439/682 |

(Continued)

FOREIGN PATENT DOCUMENTS

| | | |
|---|---|---|
| CN | 202183478 U | 4/2012 |
| CN | 206524433 U | 9/2017 |

(Continued)

*Primary Examiner* — Truc T Nguyen
(74) *Attorney, Agent, or Firm* — Ming Chieh Chang

(57) ABSTRACT

A contact module for an electrical connector includes: an insulator; and a row of contacts insert-molded with the insulator, each of the row of contacts including a soldering tail and a body having a securing portion and a contacting portion, the soldering tail of each contact pointing toward a forward direction, wherein the securing portion of each contact has an upper level segment, a front upstanding segment continuing the upper level segment, a lower level segment continuing the front upstanding segment, and a rear upstanding segment continuing the lower level segment and connecting to the soldering tail thereof, and the lower level segment of each contact is offset from the soldering tail thereof.

5 Claims, 11 Drawing Sheets

(56) References Cited

U.S. PATENT DOCUMENTS

| | | | | |
|---|---|---|---|---|
| 2012/0282811 | A1* | 11/2012 | Lin | H01R 13/6581 29/879 |
| 2012/0282812 | A1* | 11/2012 | Lin | H01R 12/73 439/638 |
| 2013/0040496 | A1* | 2/2013 | Cai | H01R 12/724 439/626 |
| 2016/0294130 | A1* | 10/2016 | Guo | H01R 24/60 |
| 2017/0279204 | A1 | 9/2017 | Kudo | |
| 2019/0097361 | A1* | 3/2019 | Wang | H01R 24/60 |
| 2024/0396280 | A1* | 11/2024 | Shi | H01R 13/405 |
| 2025/0266638 | A1* | 8/2025 | Yang | H01R 13/652 |

FOREIGN PATENT DOCUMENTS

| | | | |
|---|---|---|---|
| CN | 207677122 | U | 7/2018 |
| CN | 210224337 | U | 3/2020 |
| CN | 106711667 | B | 9/2020 |
| CN | 215911645 | U | 2/2022 |
| TW | M377745 | U | 4/2010 |
| TW | M563683 | U | 7/2018 |

* cited by examiner

ELECTRICAL CONNECTOR CONTACT MODULE HAVING A ROW OF CONTACTS WITH LOWER LEVEL SEGMENTS OFFSET FROM SOLDERING TAILS THEREOF

BACKGROUND OF THE INVENTION

Field of the Invention

The present invention relates to a contact module for an electrical connector, comprising an insulative housing and a row of contacts insert-molded with the insulative housing, each of the row of contacts including a soldering tail and a body having a securing portion and a contacting portion, the soldering tail of each contact pointing toward a forward direction, wherein the securing portion of each contact has multiple segments configured for ease of molding the contact module.

Description of Related Arts

China Patent No. 210224337 discloses an electrical connector comprising an insulative housing and two rows of contacts insert-molded with the insulative housing. Each contact of the two rows of contacts includes a soldering tail and a body having a securing portion and a contacting portion. The soldering tail of each contact extends or points toward a forward direction. The securing portion of each contact has an upstanding segment connecting to the soldering tail and exposing to outside, i.e., not embedded in the insulative housing, which is apt to damage.

SUMMARY OF THE INVENTION

A contact module for an electrical connector comprises: an insulator; and a row of contacts insert-molded with the insulator, each of the row of contacts including a soldering tail and a body having a securing portion and a contacting portion, the soldering tail of each contact pointing toward a forward direction, wherein the securing portion of each contact has an upper level segment, a front upstanding segment continuing the upper level segment, a lower level segment continuing the front upstanding segment, and a rear upstanding segment continuing the lower level segment and connecting to the soldering tail thereof, and the lower level segment of each contact is offset from the soldering tail thereof.

DETAILED DESCRIPTION OF THE DRAWINGS

Figure 1:
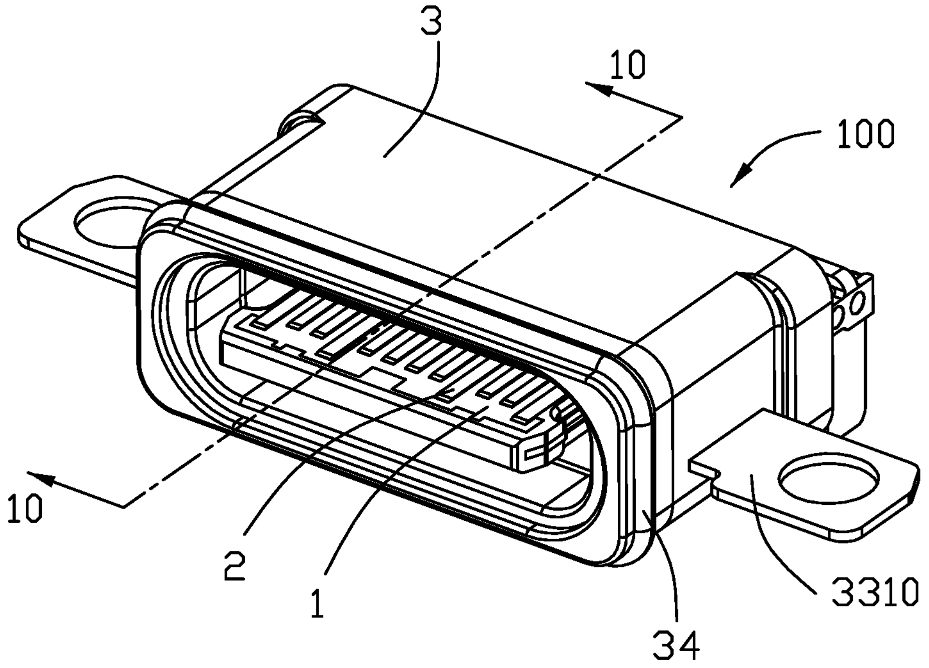
FIG. 1 is a perspective view of an electrical connector in accordance with the present invention.
Figure 2:
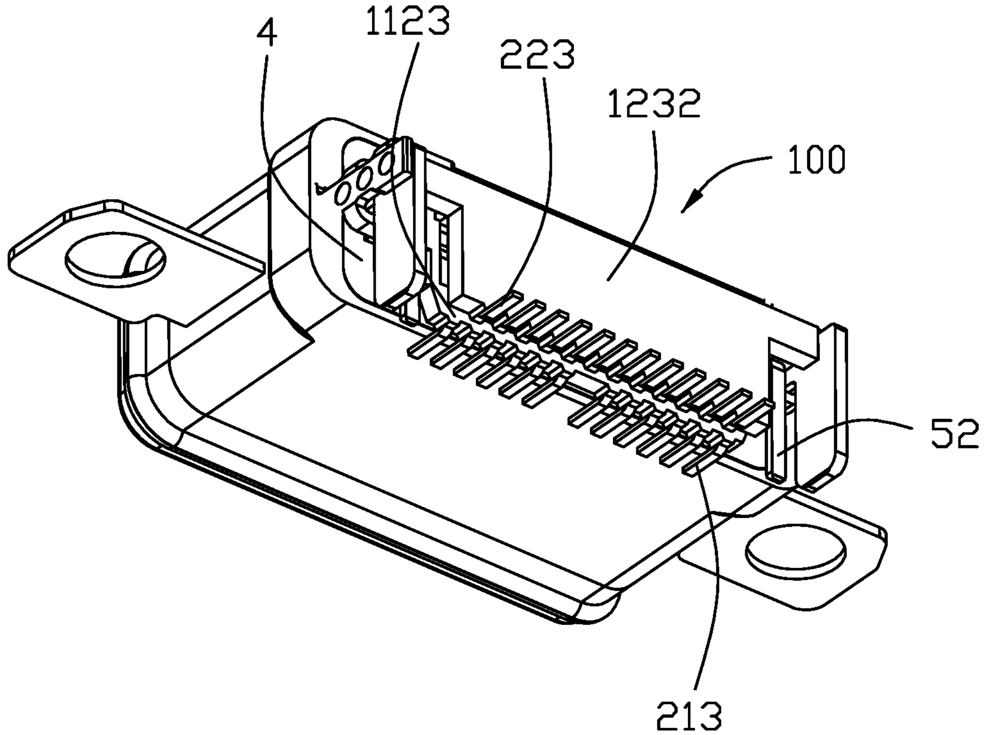
FIG. 2 is another perspective view of the electrical connector in FIG. 1.
Figure 3:
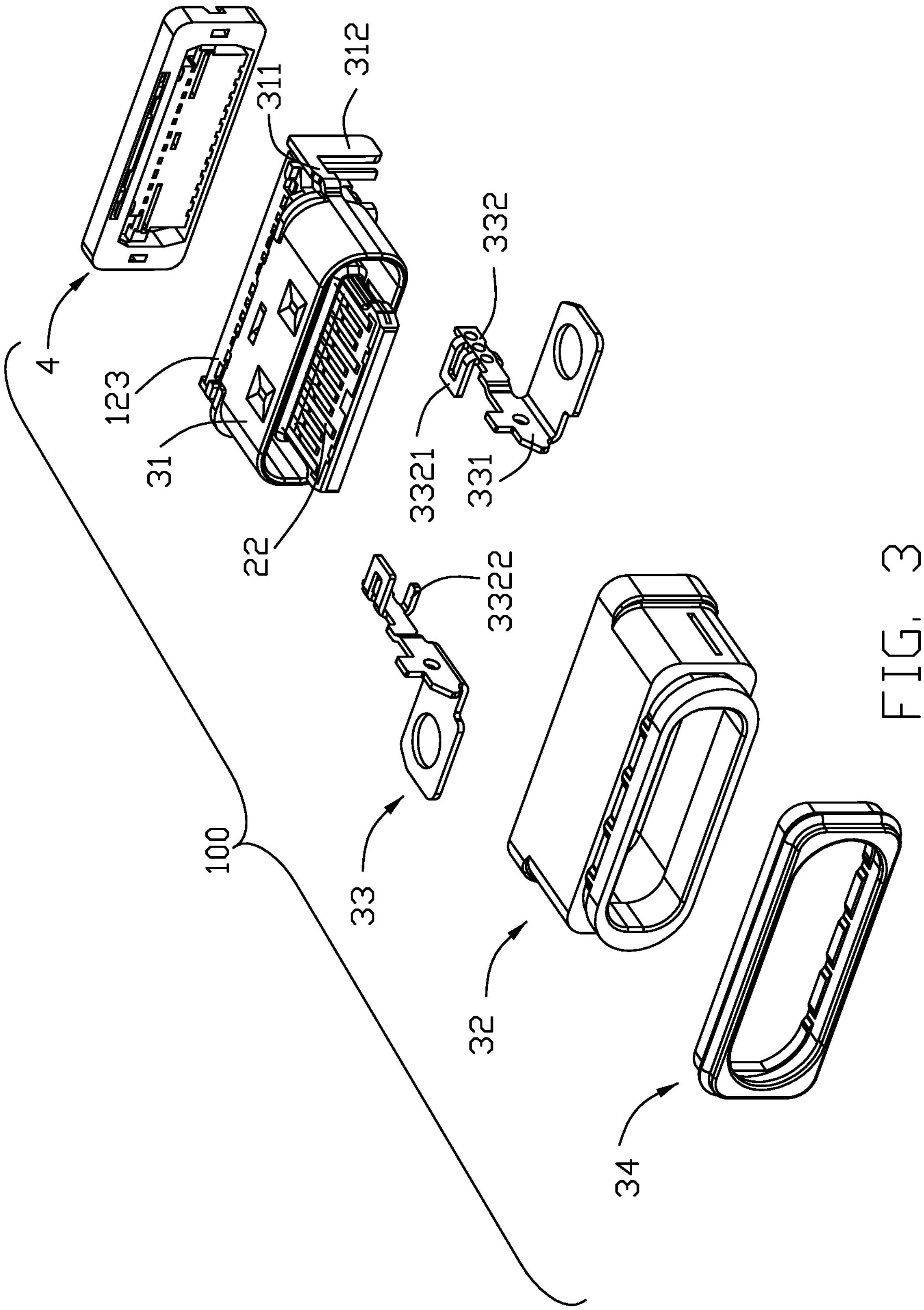
FIG. 3 is an exploded view of FIG. 1.
Figure 4:
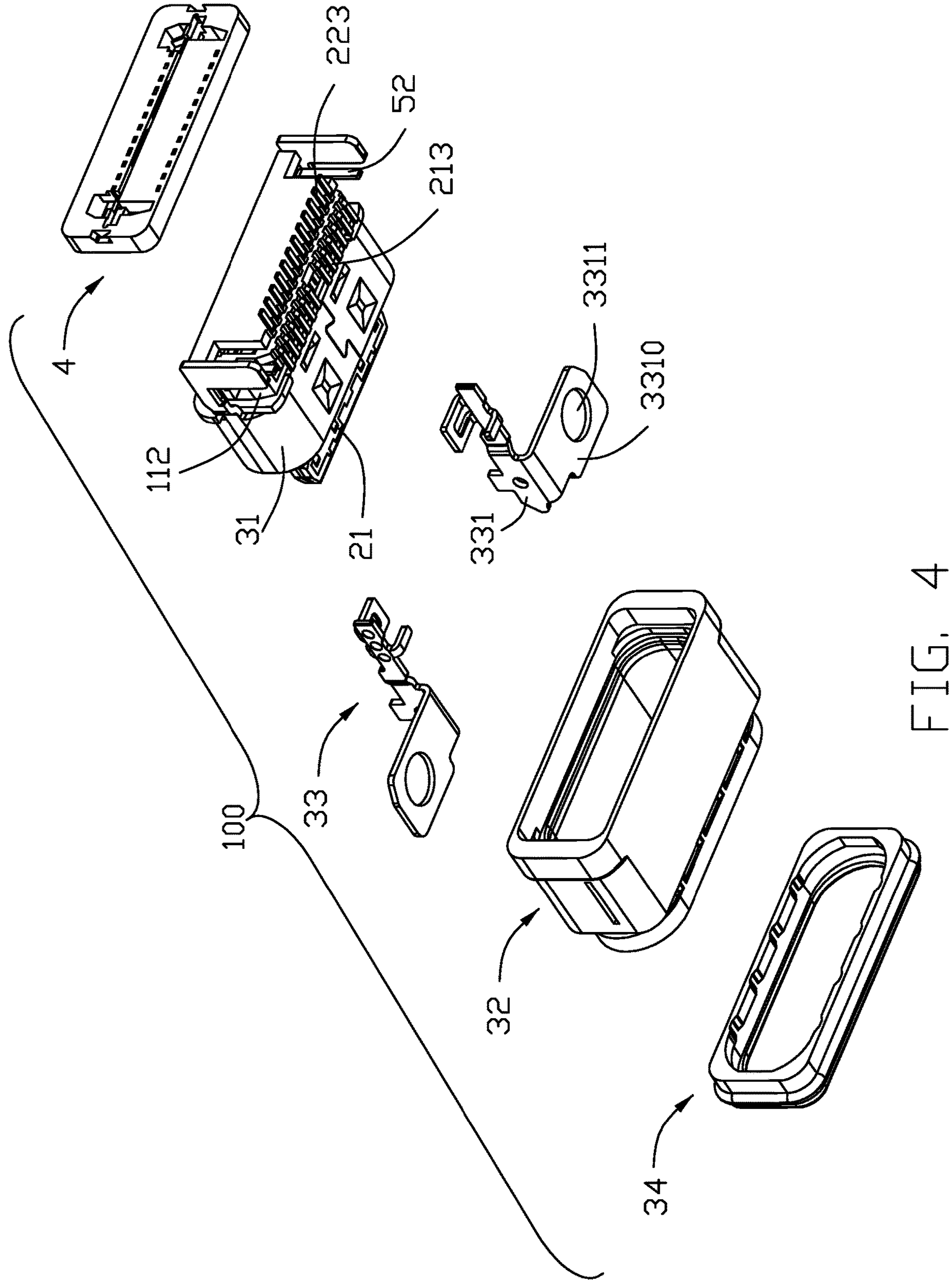
FIG. 4 is a view similar to FIG. 3 but from a different perspective.
Figure 5:
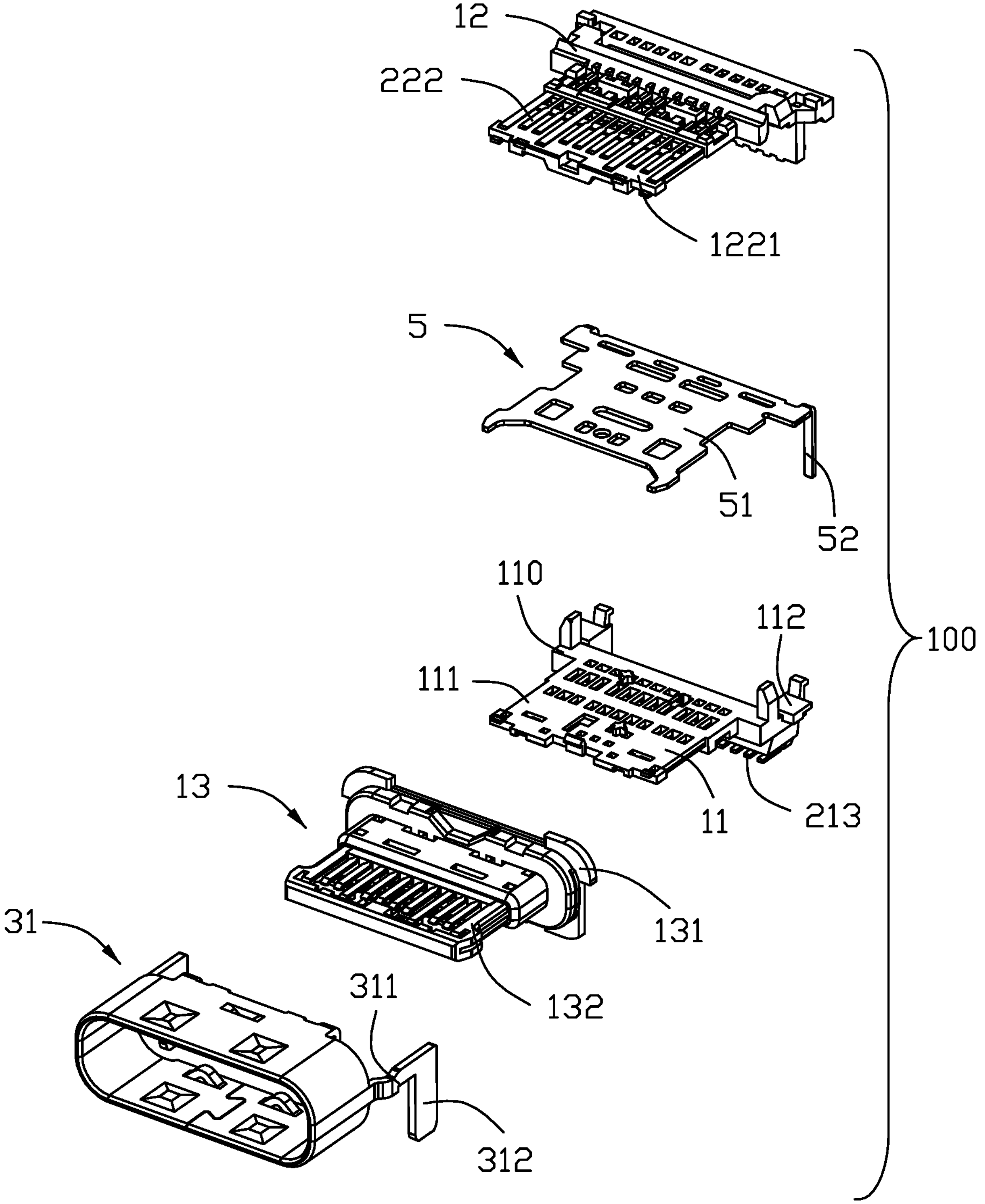
FIG. 5 is a further exploded view of FIG. 3 omitting several components.
Figure 6:
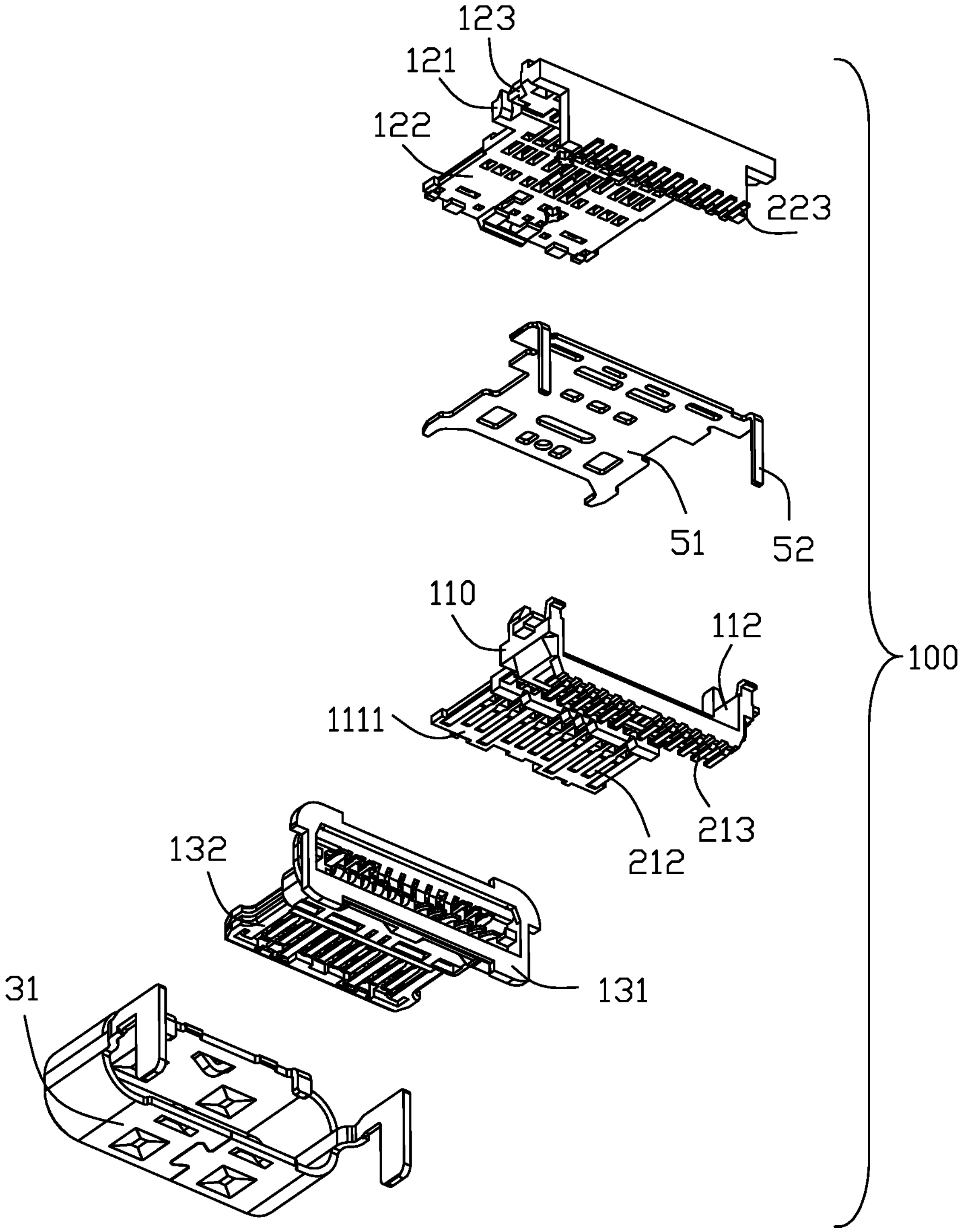
FIG. 6 is a view similar to FIG. 5 but from a different perspective.
Figure 7:
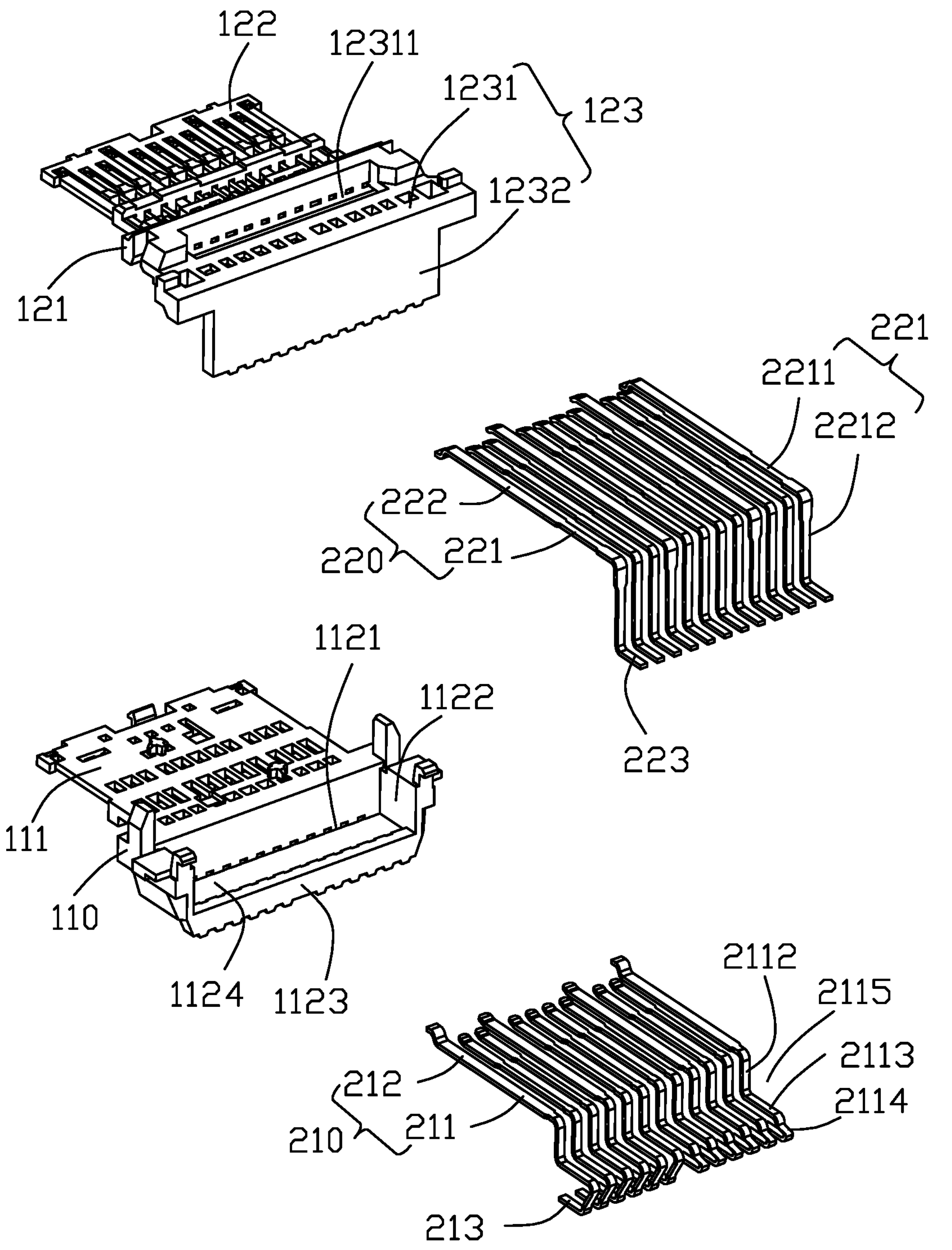
FIG. 7 is an exploded view of a contact module of the electrical connector.
Figure 8:
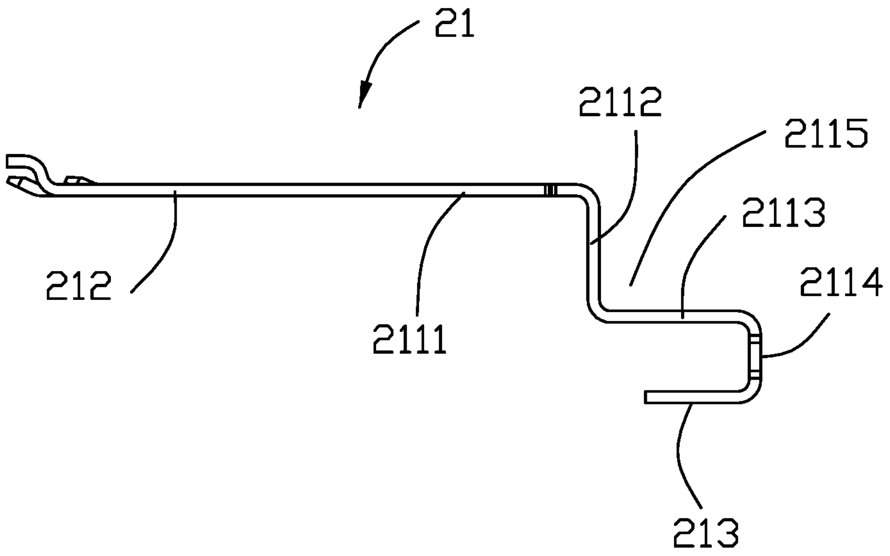
FIG. 8 is a side view of a row of contacts of the contact module.
Figure 9:
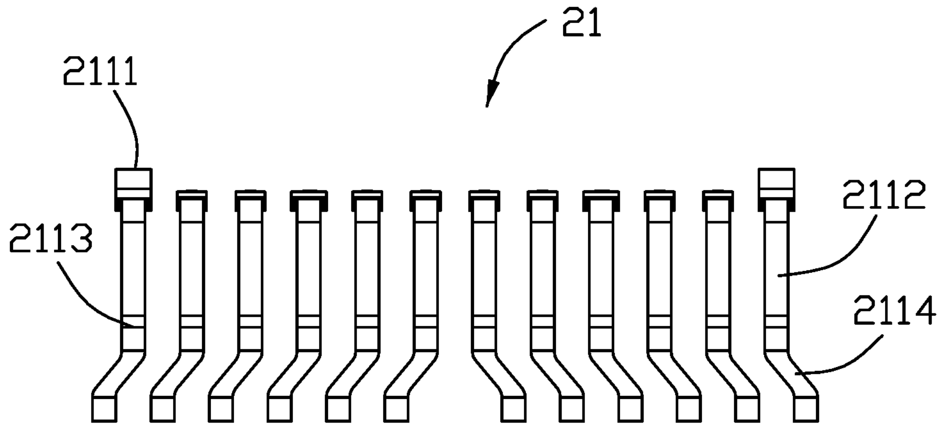
FIG. 9 is a rear view of the row of contacts.
Figure 10:
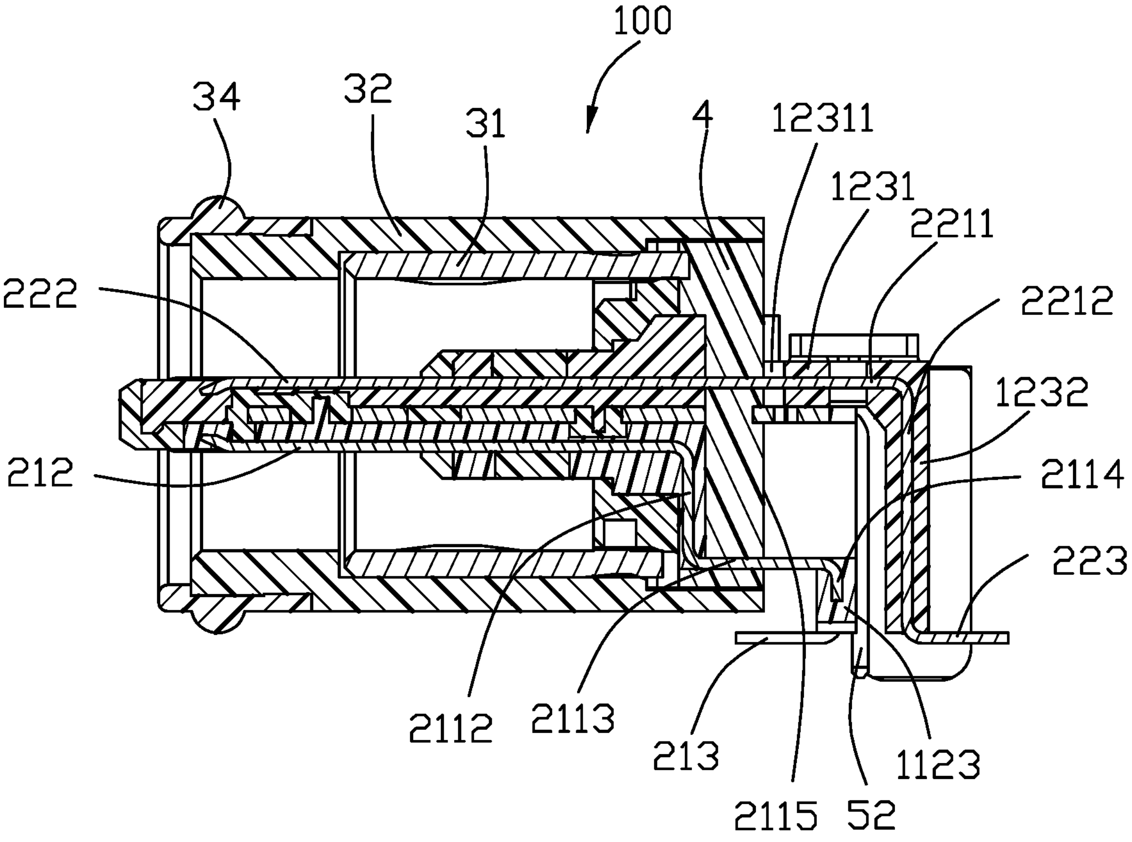
FIG. 10 is a cross-sectional view of the electrical connector taken along line 10-10 in FIG. 1.
Figure 11:
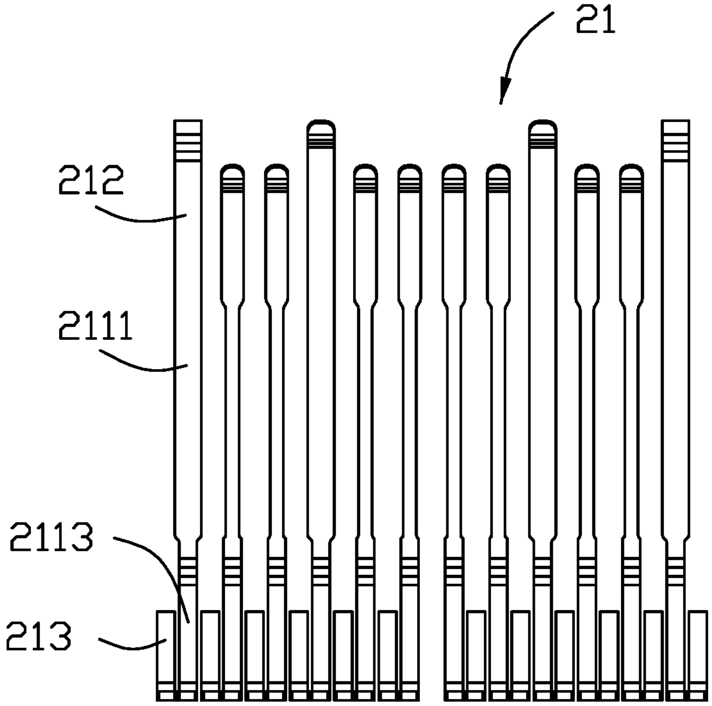
FIG. 11 is a rear view of the row of contacts.

Referring to FIGS. 1-11, an electrical connector 100 comprises an insulative housing 1, a plurality of contacts 2 secured to the insulative housing 1, and a shielding shell 3 enclosing the insulative housing 1. The electrical connector 100 may, for example, be a USB Type C receptacle connector.

The plurality of contacts 2 are insert-molded with the insulative housing 1. The insulative housing 1 includes a first insulator 11, a second insulator 12, and an over-mold 13. The plurality of contacts 2 include a row of first contacts 21 insert-molded with the first insulator 11 and a row of second contacts 22 insert-molded with the second insulator 12. The second insulator 12 is mounted on top of the first insulator 11 and the over-mold 13 is insert-molded with the combined first and second insulators 11 and 12.

Each of the row of first contacts 21 includes a soldering tail 213 and a body 210 having a securing portion 211 and a contacting portion 212. The first insulator 11 includes a base 110, a front tongue 111, and a rear mounting portion 112. The contacting portion 212 is exposed to a mating surface 1111 of the tongue 111. The securing portion 211 has an upper level segment 2111, a front upstanding segment 2112 continuing the upper level segment 2111, a lower level segment 2113 continuing the front upstanding segment 2112, and a rear upstanding segment 2114 continuing the lower level segment 2113 and connecting to the soldering tail 213. The soldering tail 213 points forwardly. An access space 2115 is defined behind the front upstanding segment 2112 and over the lower level segment 2113. Forward bending construction of the soldering tail 213 reduces a size of the connector 100 along a front-to-back direction. The lower level segment 2113 is offset from the soldering tail 213 in a lateral direction so that a molding tool is able to press on the soldering tails 213 via the access space 2115 and gaps between every adjacent lower level segments 2113. In this embodiment, for each first contact 21, the upper level segment 2111, the front upstanding segment 2112, and the lower level segment 2113 are in a line as viewed from top while the rear upstanding segment 2114 is slanted laterally so that the soldering tail 213 is offset from the lower level segment 2113.

The rear mounting portion 112 of the first insulator 11 has a first portion 1121 embedding the front upstanding segment 2112, a pair of side portions 1122, and a second portion 1123 embedding the rear upstanding segment 2114. A groove 1124 is defined between the first and second portions 1121 and 1123 to expose the lower level segment 2113. By way of bending formation of the front and rear upstanding segments 2112 and 2114 of the securing portion 211, the molding tool may be lowered up to the groove 1124 so that cores of molding tool may be shortened to thereby increase its life of use.

Each of the row of second contacts 22 includes a soldering tail 223 and a body 220 having a securing portion 221 and a contacting portion 222. The soldering tail 223 points rearwardly. The second insulator 12 includes a base 121, a front tongue 122, and a rear mounting portion 123. The contacting portion 222 is exposed to a mating surface 1221 of the tongue 122. The securing portion 221 has a level segment 2211, an upstanding segment 2212 continuing the level segment 2211 and connecting to the soldering tail 223.

The mounting portion 123 has a covering portion 1231 over the rear mounting portion 112 of the first insulator 11 and a portion 1231 embedding the upstanding segment 2212. The covering portion 1231 has a slot 12311 in fluid communication with the groove 1124 for formation of a sealing member 4 over exposed contact segments 2113 and 2211.

The over-mold 13 has a portion 131 over-molding the base 110 and the base 121 and a portion 132 over-molding the tongue 111 and the tongue 122. The connector 200 may further include a shielding plate 5 located between the upper row of contacts 22 and the lower row of contacts 21. The shielding plate 5 may have a body 51 and a pair of legs 52.

The shielding shell 3 has a metallic body 31 enclosing the over-mold 13 and an insulative body 32 enclosing the metallic body 31. The metallic body 31 has a pair of side portions 311 with soldering legs 312. The insulative body 32 includes a pair of mounting pieces 33 integrally formed therewith. Each mounting pieces 33 has a main part 331 and an extension 332. The main part 331 has a portion 3310 with a hole 3311. The extension 332 is spot welded to the side portion 311 of the shielding shell metallic body 31 and has a latching portion 3321 and a detent 3322. The connector 200 may also include a front sealing member 34.

The invention claimed is:

1. An electrical connector comprising:

an insulative housing including a base, a front tongue, and a rear mounting portion; and an upper and lower rows of contacts secured to the insulative housing, each contact of the upper and lower rows of contacts including a soldering tail and a body having a securing portion and a contacting portion, the soldering tail of each contact in the upper row pointing toward a rearward direction while the soldering tail of each contact in the lower row pointing toward a forward direction; wherein the securing portion of each contact in the lower row has an upper level segment, a front upstanding segment continuing the upper level segment, a lower level segment continuing the front upstanding segment, and a rear upstanding segment continuing the lower level segment and connecting to associated soldering tail; and the lower level segment of each contact in the lower row is offset from associated soldering tail.

2. The electrical connector as claimed in claim 1, wherein the rear upstanding segment of each contact is slanted laterally.

3. The electrical connector as claimed in claim 1, wherein the front upstanding segment and the rear upstanding segment are embedded in the rear mounting portion of the insulative housing.

4. The electrical connector as claimed in claim 1, further comprising a shielding shell enclosing the insulative housing.

5. The electrical connector as claimed in claim 1, further comprising a shielding plate between the upper row of contacts and the lower row of contacts.

* * * * *